Dec. 23, 1969  A. L. FREEDLANDER ET AL  3,485,022

OFFSET MOWER BLADE

Filed Feb. 19, 1968

INVENTORS
ABRAHAM L. FREEDLANDER
ROBERT E. MATTHEWS
WAYNE C. GARRETT

BY Reuben Wolk

ATTORNEY

3,485,022
OFFSET MOWER BLADE

Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Feb. 19, 1968, Ser. No. 706,361
Int. Cl. A01d 55/18
U.S. Cl. 56—295                 6 Claims

ABSTRACT OF THE DISCLOSURE

A flexible elastomeric lawn mower blade having a center mounting plate in which the central portion of the blade is offset from the cutting edges in a vertical direction.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown about great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc., the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our copending application Ser. No. 759,825, filed on Sept. 11, 1968, which is a continuation of Ser. No. 816,166 filed Apr. 8, 1969 which is a continuation of Ser. No. 625,802, filed on Mar. 24, 1967, we have described a blade formed primarily of a flexible elastomeric material, but having a rigid central mounting plate embedded therein. The present invention relates to a blade which is similar, but has somewhat improved grass cutting ability. This is accomplished by offsetting the center portion of the blade in a vertical direction from the plane of the cutting edges so that the non-cutting portions of the blade will be above the cutting portions during the mowing operation. This reduces the drag on the engine and improves the over-all cutting efficiency and appearance of the grass.

The invention will be more fully understood by referring to the following description and drawing, in which.

Figure 1:
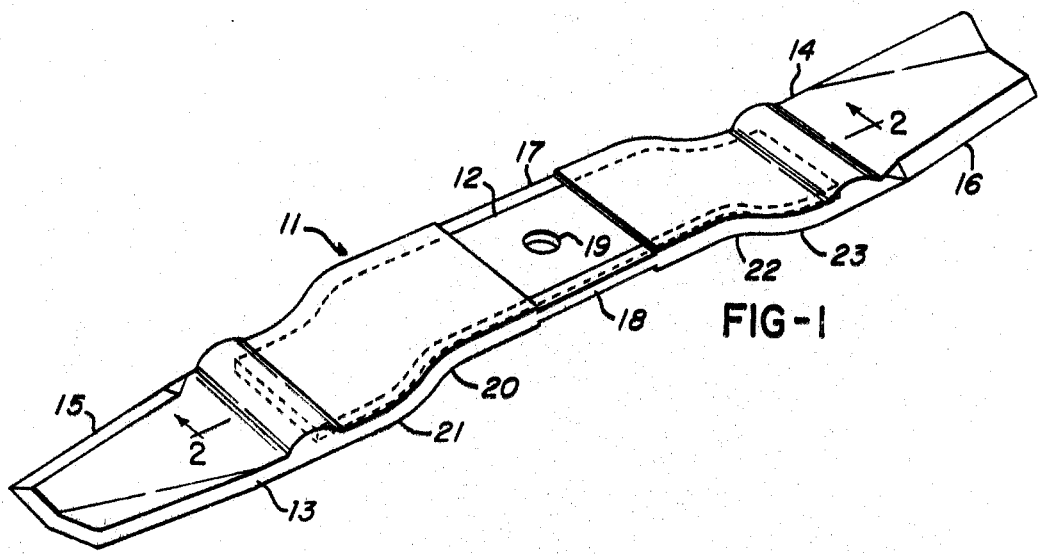
FIGURE 1 is a perspective view of a novel blade in accordance with the invention.
Figure 2:
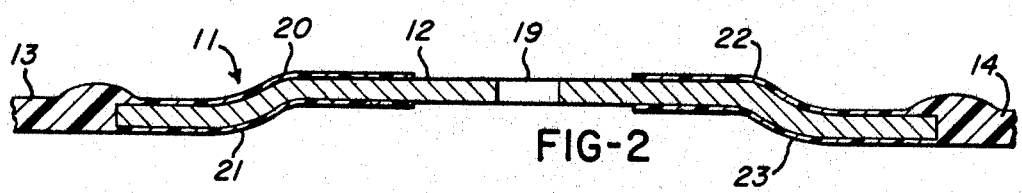
FIGURE 2 is a cross section of the blade taken along line 2—2 of FIGURE 1.

Referring now to the drawing, FIGURE 1 illustrates a novel lawn mower blade 11 which is generally rectangular in shape and has outwardly extending arms 13 and 14 having cutting edges 15 and 16 at their extremities. These arms are made of an elastomer, and preferably a urethane elastomer such as more fully described in the above-referenced patent application. As indicated above, the material provides a cutting member and yet has the necessary flexibility to minimize injuries. The outermost edge portions of the blade are beveled to provide cutting edges. Although it is possible to make the blade entirely of the elastomeric material, it may sometimes be desirable to provide mounting and additional rigidity in the central portion, and for this purpose a rigid central mounting plate 12 is incorporated within the body of the central portion as shown in the drawings. This plate 12 may be made of metal or of a rigid plastic material such as nylon, polycarbonate, polystyrene, polyacetal, or the like. A mounting hole 17 extends through the center of the plate for the purpose of mounting the blade on the shaft of the lawn mower. As shown in the drawings, the plate 12 is at least partially embedded within the arms 13 and 14, the central portion of the plate being exposed.

In the particular form of the invention illustrated, strips of elastomer 17 and 18 are located at the outer sides of the exposed portion of plate 12, although this arrangement is not necessary in practicing the invention. As indicated above, the present invention refers to the relationship of the central portion of the blade and plate which is offset in a vertical direction from the plane of the cutting edges. The blade is first bent downward from the plane of the central portion at bend lines designated as 20 and 22, then bent upward at bend lines 21 and 23 to create this arrangement. The blade may be formed by pre-bending the plate 12 as shown, and then casting the elastomer on the plate; or the casting operation may occur using a flat plate, with the bending operation taking place afterwards. So good is the adhesion of the elastomer to the plate that it is entirely feasible to perform this bending afterwards without fear of breaking the bond.

The resultant product has been found to operate with less drag, because the cutting edges are virtually the only part of the blade which contacts the grass, the remainder of the bladed being in a plane above the plane of these cutting edges. It is of special importance to elevate the mounting bolts and washer which would extend into the cutting plane in flat blades, it has been found that even though the grass is cut away around the bolt and washer, there is still a little tendency for some of the blades of grass to spring back and be contacted by the bolt. This, is, of course, also true of the remaining non-cutting portions of flat blades, so that eliminating this contact is advantageous in reducing drag.

Figure 3:
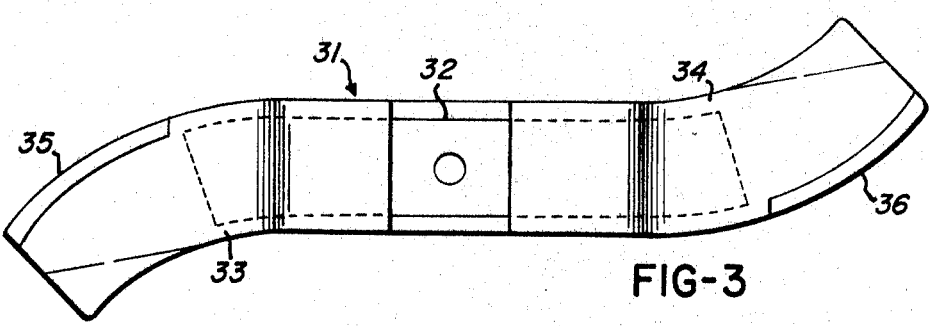
FIGURE 3 is an elevational view of a modified form of blade.

FIGURE 3 illustrates a modification of the principal form of the invention. The blade 31 has a central plate 32, arms 33 and 34, and cutting edges 35 and 36. This blade is similar to the blade 11 in all respects except that the ends of the arms are oppositely curved in a plane at right angles to the shaft, somewhat in the manner of a scimitar. The shape is similar to that described in our earlier United States Patent No. 3,343,355, issued September 26, 1967. This shape enhances the cutting action of the blade by permitting the cutting surface to strike the blades of grass at an angle to provide a slicing action. The cutting edges 35 and 36 are on the convex side of the curve.

Other modifications are contemplated as being within the scope of the invention.

We claim:

1. In a lawn mower having a rotatable shaft and a cutting blade mounted thereon, said blade including outwardly extending arms having integral cutting edges of a flexible elastomer, and a rigid central mounting plate extending outwardly into said arms and terminating inwardly of said cutting edges, the central portion of said blade being offset from the plane of said cutting edges.

2. The blade of claim 1 in which the outer ends of said plate lie in the plane of said cutting edges.

3. The blade of claim 1 in which said elastomer is urethane.

4. The blade of claim 1 in which said plate is metal.

5. The blade of claim 1 in which said plate is a rigid plastic.

6. The blade of claim 1 in which said arms are oppositely curved in a plate at right angles to the shaft.

References Cited

UNITED STATES PATENTS

| | | | |
|---|---|---|---|
| 2,473,665 | 6/1949 | Van Nort | 170—159 |
| 2,517,405 | 8/1950 | Moss | 56—295 |
| 3,156,082 | 11/1964 | Joyner | 56—295 |
| 3,302,377 | 2/1967 | Ely | 56—295 |
| 3,320,732 | 5/1967 | Kirk | 56—295 |
| 3,340,682 | 9/1967 | Ely | 56—295 |

ANTONIO F. GUIDA, Primary Examiner

P. A. RAZZANO, Assistant Examiner

PO-1050
(5/69)

UNITED STATES PATENT OFFICE
CERTIFICATE OF CORRECTION

Patent No. 3,485,022          Dated     December 23, 1969

Inventor(s) Abraham L. Freedlander, Robert E. Matthews and Wayne C. Garrett

It is certified that error appears in the above-identified patent and that said Letters Patent are hereby corrected as shown below:

Column 2, lines 6 through 8 should read as follows:

In our copending application Serial No. 816,166 filed April 8, 1969, which is a continuation of Serial No. 759,825, filed on Sept. 11, 1968, which is a continuation of Serial No.

Signed and sealed this 22nd day of June 1971.

(SEAL)
Attest:

EDWARD M. FLETCHER, JR.         WILLIAM E. SCHUYLER, JR.
Attesting Officer                  Commissioner of Patents